United States Patent
Kazama

(10) Patent No.: US 8,823,857 B2
(45) Date of Patent: Sep. 2, 2014

(54) IMAGE APPARATUS

(75) Inventor: Yasuhiro Kazama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 13/444,401

(22) Filed: Apr. 11, 2012

(65) Prior Publication Data

US 2012/0268641 A1 Oct. 25, 2012

(30) Foreign Application Priority Data

Apr. 21, 2011 (JP) ................ 2011-095398

(51) Int. Cl.
*H04N 5/222* (2006.01)
*G03B 13/00* (2006.01)
*H04N 5/232* (2006.01)
*H04N 5/225* (2006.01)

(52) U.S. Cl.
CPC ......... *H04N 5/2258* (2013.01); *H04N 5/23296* (2013.01); *H04N 5/23293* (2013.01); *H04N 5/23212* (2013.01)
USPC .................. 348/333.11; 348/333.05; 348/345

(58) Field of Classification Search
CPC ............ H04N 5/2258; H04N 5/23212; H04N 5/23293; H04N 5/23296
USPC ............................................. 348/333.01–347
See application file for complete search history.

(56) References Cited

U.S. PATENT DOCUMENTS

| | | | |
|---|---|---|---|
| 7,492,406 B2 * | 2/2009 | Park et al. | 348/333.05 |
| 7,711,258 B2 * | 5/2010 | Yanagi | 396/88 |
| 2003/0160886 A1 * | 8/2003 | Misawa et al. | 348/347 |
| 2009/0009531 A1 * | 1/2009 | Sudo et al. | 345/629 |
| 2009/0153649 A1 * | 6/2009 | Hirooka et al. | 348/47 |
| 2009/0256932 A1 * | 10/2009 | Morimoto | 348/231.99 |
| 2010/0245630 A1 * | 9/2010 | Kurokawa | 348/240.99 |
| 2011/0043663 A1 * | 2/2011 | Tsuchiya | 348/240.3 |
| 2011/0234853 A1 * | 9/2011 | Hayashi et al. | 348/231.99 |
| 2011/0234881 A1 * | 9/2011 | Wakabayashi et al. | 348/333.05 |

FOREIGN PATENT DOCUMENTS

| | | |
|---|---|---|
| JP | 2005-080093 | 3/2005 |
| JP | 2006-109199 | 4/2006 |
| JP | 2007-043502 | 2/2007 |
| JP | 4050385 | 12/2007 |

* cited by examiner

*Primary Examiner* — Timothy J Henn
*Assistant Examiner* — Pritham Prabhakher
(74) *Attorney, Agent, or Firm* — Oblon, Spivak, McClelland, Maier & Neustadt, L.L.P.

(57) ABSTRACT

An image apparatus, including a main optical system that captures a first image, a sub optical system that captures a second image to assist capturing the first image, a display device that displays the first image and the second image in a live view, and a signal processor that controls at least one of a frame rate of the first image from the main optical system and a frame rate of the second image from the sub optical system. The signal processor controls the frame rate of the first image data and the second image data such that the first and second frame rates become the same, and the display device displays the first image and the second image on the display device.

10 Claims, 13 Drawing Sheets

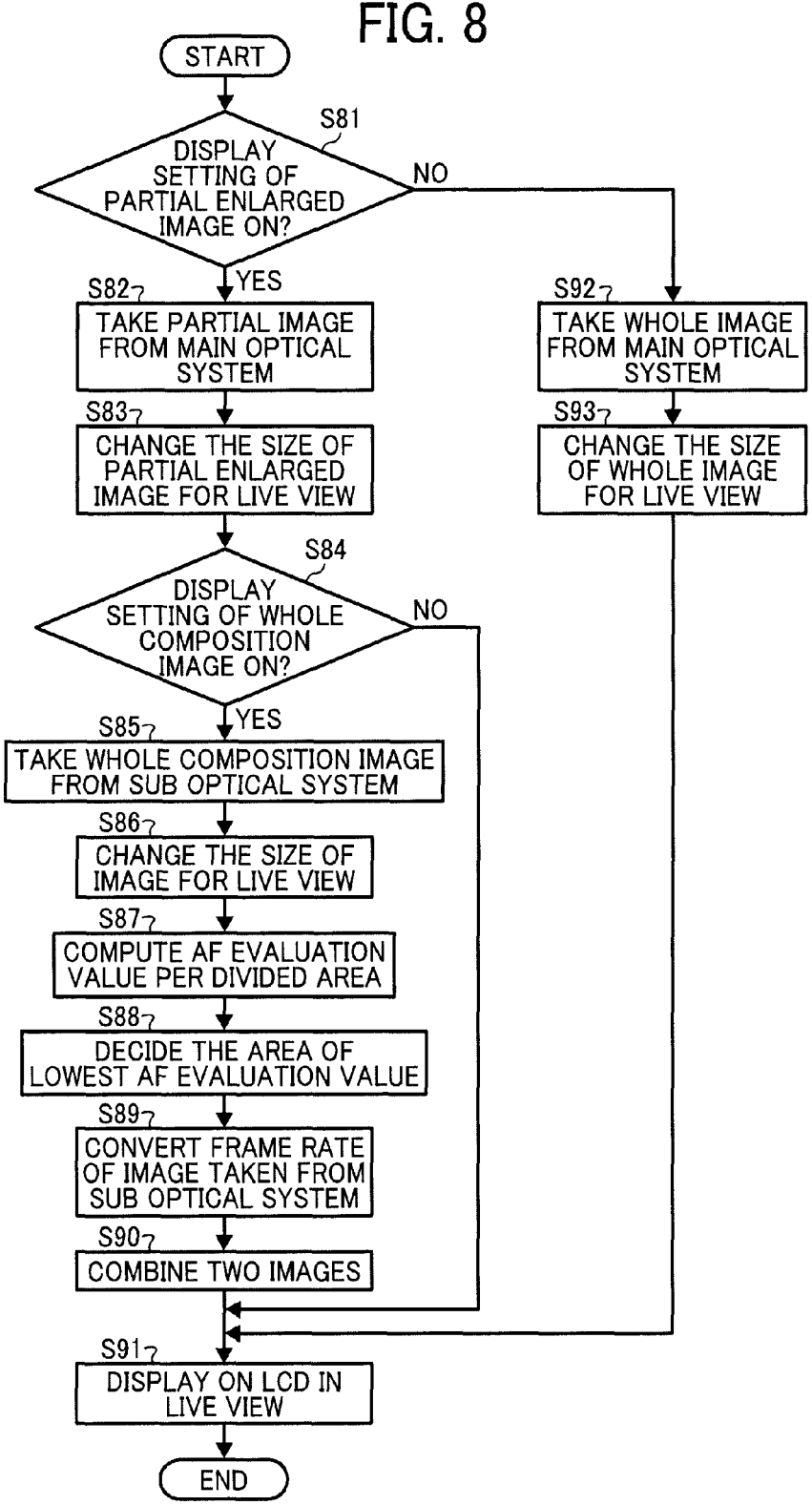

IMAGE APPARATUS

CROSS-REFERENCE TO RELATED APPLICATIONS

The present application claims priority to and incorporates by reference the entire contents of Japanese Patent Application No. 2011-095398 filed in Japan on Apr. 21, 2011.

BACKGROUND OF THE INVENTION

1. Field of the Invention

The present invention relates to an image apparatus, for example a digital still camera. In particular, it relates to a displaying technology in operations of a manual focus mode and a zoom mode.

2. Description of the Related Art

Conventionally, an image apparatus such as a digital still camera includes a small LCD (Liquid Crystal Display) as a display device. The display device displays an image to be captured in real-time. In a case of operating in a manual focus mode, the operator confirms the image on the display device and carries out a release operation for photographing when the object is in focus.

However, the screen of the general display device in the image apparatus is small and has a low resolution, and just shows the image in a decreased size and decreased number of pixels. Because of the low resolution of the screen, even though the operator thinks an object is in focus through the display device, the object may not actually be in focus. In other words, the operator may not be able to evaluate the degree of focus through the display device.

Some digital still cameras have a function to evaluate the degree of focus correctly in a case of operating in the manual focus mode. That function is that an output from a part of the image capturing device (CCD) is read out to recognize a focus and the output is enlarged on the screen of the display device to indicate the degree of focus.

In such a manner, the operator can decide the degree of focus by a part of the image and take a photograph with correct focus. However, the operator can not see the entirety of the image since the screen just shows the part of the image. The operator can not recognize a whole area to be photographed.

Some digital still cameras have a zoom function. In a case of using the zoom function, the display device only shows the image of the object which is zoomed. The operator may miss the object when the object moves fast. Further, if the object is affected by changes around the object, the operator may miss a timing of the release operation.

Japanese laid open patent 2007-43502 discloses that an image apparatus includes a main light detecting unit having a zoom lens, a sub light detecting unit having a single focus lens, and a display unit. The display unit shows both main image data from the main light detecting unit and sub image data from the sub light detecting unit. The display unit highlights the area corresponding to the main image data in the sub image data.

According to the apparatus of Japanese laid open patent 2007-43502, the image display shows two images to prevent the object from being out of the photograph. One image is main image data which is enlarged in a live view (monitoring) of the object with optical zoom. The other image is sub image data which is in a live view of both the object itself and around the object. In the sub image data, the part of the main image data is surrounded by a frame border.

In a case of operating in a manual focus mode, both an image that is an enlarged part of the entirety to be photographed and an image of the entirety to be photographed are displayed in the same display device. The operator can then confirm the degree of focus and the composition of the entirety to be photographed.

However, when a first image that is the enlarged part of the entirety to be photographed and the second image of the entirety to be photographed are displayed in the same display device, a difference of display timing between the first image and the second image occurs since there is a difference of frame rate between the respective images. The operator may have a feeling of unease or strangeness by the difference of the display timing, and may then miss the photo opportunity when the object moves fast. It then is still difficult for the operator to evaluate the degree of focus correctly.

SUMMARY OF THE INVENTION

One object of the present invention is to address the problems disclosed in the above background technology. In other words, when a first image that is an enlarged part of the entirety to be photographed and a second image of the entirety are displayed in the same display, the difference of the display timing between the first image and the second image is reduced. The present invention can thereby reduce a feeling of unease or strangeness of the operator, and the operator can take a picture of the moving object without unease or strangeness and evaluate the degree of focus more properly.

According to an aspect of the present invention, an image apparatus includes a main optical system that captures a first image, a sub optical system that captures a second image to assist capturing the first image, a display device that displays the first image and the second image in a live view, and a signal processor that controls at least one of a frame rate of the first image from the main optical system and a frame rate of the second image from the sub optical system. The signal processor controls the frame rate of the first image data and the second image data such that the first and second frame rates become the same, and the display device displays the first image and the second image on the display device.

According to an embodiment of the present invention, a first image that is an enlarged part of the entirety to be photographed and a second image of the entirety are displayed in the same display without a substantial difference in the display timing or with only a small difference in the display timing. The operator can thereby confirm the degree of focus and the entirety of the photograph before taking a picture.

Further, when the object is zoomed on, a first image that is an enlarged part of the object and a second image which is around the first image are displayed in the same display during a live view without a substantial difference in the display timing or with only a small difference in the display timing. Therefore, the operator can track movements and changes around the first image even after zooming and can take a picture at a suitable timing.

BRIEF DESCRIPTION OF THE DRAWINGS

FIG. 8 is a flowchart illustrating an example to decide a display position by an AF evaluation per a divided area corresponding to the first embodiment of the present invention;

DETAILED DESCRIPTION OF PREFERRED EMBODIMENTS

Hereinafter, an imaging apparatus according to exemplary embodiments of the invention will be described in detail with reference to the accompanying drawings. In the following description, the invention is applied to a digital still camera. However, the invention can be widely applied to all types of imaging apparatuses having a similar function.

<Structure of Digital Still Camera>

Figure 1A:
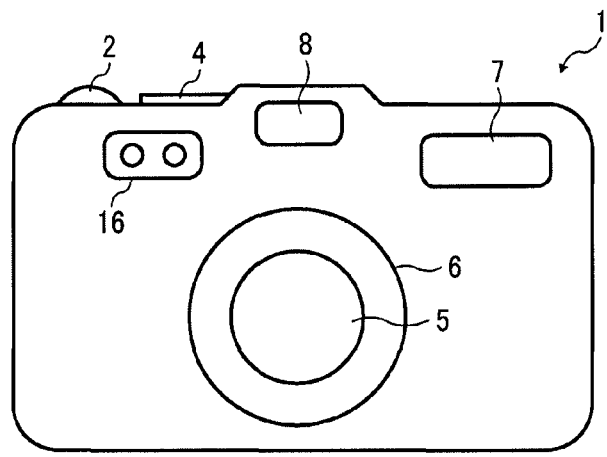
FIG. 1A is a front view illustrating a digital still camera corresponding to a first embodiment of the present invention.
Figure 1B:
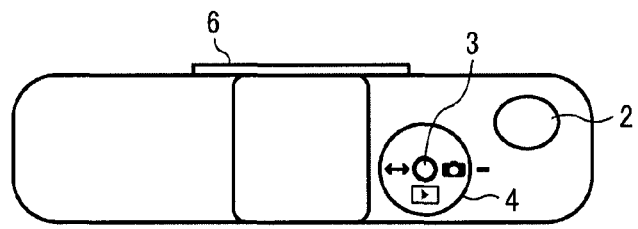
FIG. 1B is a top view illustrating a digital still camera corresponding to the first embodiment of the present invention.
Figure 1C:
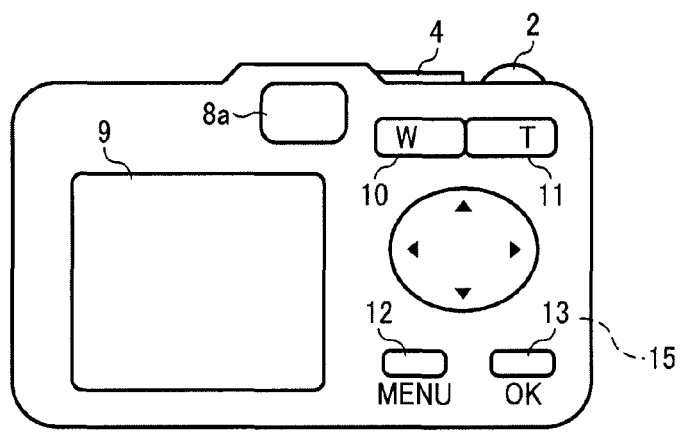
FIG. 1C is a rear view illustrating a digital still camera corresponding to the first embodiment of the present invention.

FIGS. 1A to 1C are diagrams illustrating the outward appearance of a digital still camera 1 (hereinafter digital camera 1) according to the first embodiment. FIG. 1A is a front view illustrating the digital still camera, FIG. 1B is a top view illustrating the digital still camera, and FIG. 1C is a rear view illustrating the digital still camera.

As shown in FIG. 1B, the digital still camera according to this embodiment includes on the top surface thereon a release shutter 2, a power switch 3, and a mode dial 4 that is operated to switch between a recording mode and reproduction mode. As shown in FIG. 1A, the digital still camera includes on the front surface thereon a lens barrel unit 6 including a main optical system 5, a flash light emitting unit 7, an optical finder 8, and a sub optical system 16. As shown in FIG. 1C, the digital still camera according to this embodiment includes on the rear surface thereof a liquid crystal display (LCD) monitor 9, an optical finder (rear surface) 8a, a zoom (WIDE) switch 10, a zoom (TELE) switch 11, a menu (MENU) switch 12, and an OK switch 13 that settles a selected item. The digital still camera includes on the side surface thereof a memory card slot 15 into which a memory card 14 saving image data is inserted.

Figure 2:
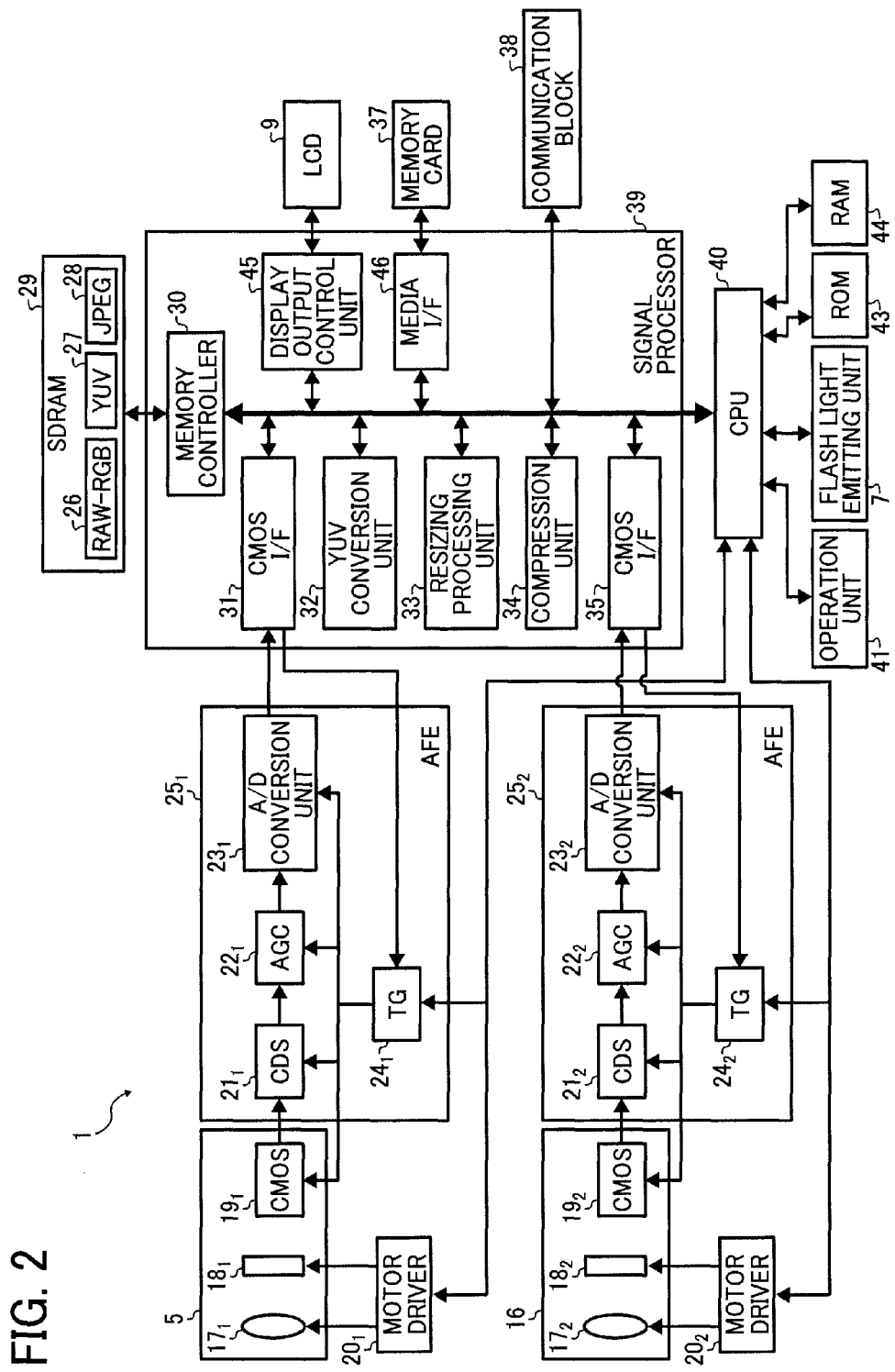
FIG. 2 is a block diagram illustrating a control system of the digital still camera corresponding to the first embodiment of the present invention.

FIG. 2 is a block diagram illustrating the control system of the digital still camera.

The digital still camera according to this embodiment includes a main optical system 5 and a sub optical system 16. The main optical system 5 includes a focus lens unit $17_1$, an aperture diaphragm and a mechanical shutter unit $18_1$, and a CMOS (Solid state image sensing device) $19_1$ onto which a light incident of the object through the main optical system 5 and the aperture diaphragm and mechanical shutter unit $18_1$ is imaged on the detection surface. The sub optical system 16 includes corresponding elements $17_2$, $18_2$, $19_2$.

The digital still camera according to the present embodiment includes the CMOS $19_1$, which outputs an electric signal (an analog RGB signal), and is connected to the main optical system 5, an AFE (analog front end) block $25_1$ that processes the analog RGB signal from the CMOS $19_1$ and outputs a digital signal, and a signal processor 39 that processes the digital signal from the AFE block $25_1$, an SDRAM 29 that temporarily stores image data, a CPU block 40 that controls the operation of each unit of the digital still camera, a motor driver $20_1$ that moves the lens barrel unit 6, a communication block 38 that communicates with an external apparatus, a memory card 37 that is removable from the digital still camera, an LCD 9 that shows an image output signal from the signal processor 39, an operation unit 41 through which the operator inputs controls, and an electronic flash unit 7 that the CPU block 40 controls turning on and turning off.

For the main optical system 5, the focus lens unit $17_1$ and the aperture diaphragm and mechanical shutter unit $18_1$ are controlled by the motor driver $20_1$ that is controlled by a drive signal from the CPU block 40. Similarly for the sub optical system 16, the focus lens unit $17_2$ and the aperture diagram and mechanical shutter unit $18_2$ are controlled by the motor drive $20_2$ that is controlled by a drive signal from the CPU block 40.

In the main optical system 5, the CMOS $19_1$ includes a photo acceptance unit arranged in two dimensions and that changes an optical image into an electric charge. The CMOS $19_1$ outputs an electric signal according to a read-out timing signal transmitted from a TG (timing signal generator) $24_1$. An RGB primary colors filter (henceforth a "RGB filter") is arranged on the CMOS $19_1$. The digital RGB image signals corresponding to the RGB three primary colors are outputted. The CMOS $19_1$ can also be provided by a CCD as a solid-state image sensing device.

The AFE $25_2$ includes the TG $24_1$, a CDS $21_1$, an AGC (analog gain control) $22_1$, and an A/D conversion unit $23_1$. The TG $24_1$ generates a signal to drive the CMOS $19_1$. The CDS $21_1$ samples the electric signal outputted from the CMOS $19_1$. The AGC $22_1$ adjusts the gain of the signal sampled in the CDS $21_1$. The A/D conversion unit $23_1$ changes into a digital signal (henceforth "RAW-RGB data") the signal on which gain adjustment was carried out by the AGC $22_1$.

Similarly, in the sub optical system 16, the CMOS $19_2$ includes a photo acceptance unit arranged in two dimensions and changes an optical image into an electric charge. The CMOS $19_2$ outputs an electric signal according to a read-out timing signal transmitted from a TG (timing signal generator) $24_2$. An RGB primary colors filter (henceforth a "RGB filter") is arranged on the CMOS $19_2$. The digital RGB image signals corresponding to the RGB three primary colors are outputted. The CMOS $19_2$ can also be provided by a CCD as a solid-state image sensing device.

The AFE $25_2$ includes the TG $24_2$, a CDS $21_2$, an AGC (analog gain control) $22_2$, and an A/D conversion unit $23_2$. The TG $24_2$ generates a signal to drive the CMOS $19_2$. The CDS $21_2$ samples the electric signal outputted from the CMOS $19_2$. The AGC $22_2$ adjusts the gain of the signal sampled in the CDS $21_2$. The A/D conversion unit $23_2$ changes into a digital signal (henceforth "RAW-RGB data") the signal on which gain adjustment was carried out by the AGC $22_2$.

The signal processor 39 includes a CMOS interface (henceforth "CMOS I/F") 31 which reads in the RAW-RGB data from the main optical system 5, a memory controller 30, a YUV conversion unit 32, a resizing processing unit 33, and a CMOS I/F 35 which reads in the RAW-RCB data from the sub optical system 16, and a compression unit 34. The memory controller 30 controls the SDRAM 29. The YUV conversion unit 32 changes the RAW-RGB data into the image data of YUV form which can be displayed and recorded. The resizing processing unit 33 changes image size according to the size of the image data displayed and recorded. The data compression unit 34 records data for example in JPEG form etc.

The CPU block 40 performs system control of the digital camera 1, based on a control program stored in a ROM 43 according to the operation inputs from the operation unit 41.

The operation unit 41 includes the release shutter 2 on the surface of the digital camera 1, the power switch 3, the mode dial 4, the zoom (WIDE) switch 10, the zoom (TELE) switch 11, the menu switch 12, and the OK switch 13 (refer to FIG. 1). A user operates the operation unit 41 and thereby a predetermined directive signal is transmitted to the CPU block 40.

The SDRAM 29 saves the RAW-RGB data taken in by the CMOS I/F 31. The SDRAM 29 saves the YUV data 27 (image data of YUV form) on which the conversion process was carried out in the YUV conversion unit 32 and an image data such as in JPEG form by which compression processing was carried out in the data compression unit 34.

The YUV of the YUV data 27 indicates the form expressing a color, and includes difference (U) of luminosity data and blue (B) data, difference (V) of luminosity data and red (R) data, and luminosity data (Y).

<Live View Operation of a Digital Camera>

Next a live view operation of the digital camera 1 and still image capture operation are explained.

A still image capture operation is performed at a time of executing the still image capture mode of the digital camera 1, to perform the live view operation explained below.

First, when a photographer turns on the power switch 3 and sets the mode dial 4 to the recording mode, the digital camera 1 starts in the recording mode. When the CPU block 40 detects that the power switch 3 was turned on and the mode dial 4 was set to the recording mode, the CPU block 40 outputs a control signal to the motor driver $20_1$, and moves the lens barrel unit 6 to the position of photography and starts the CMOS $19_1$, the signal processor 39, the SDRAM 29, the ROM 43, and the LCD 9.

Then, a photographer turns the lens barrel unit 6 having the main optical system 5 toward an object. In this way, the object image which enters through the main optical system 5 images on the photo acceptance unit of each pixel of the CMOS $19_1$. The electric signal (analog RGB image signal) according to the object image output from the CMOS $19_1$ is input into the A/D conversion unit $23_1$ through the CDS $21_1$ and the AGC $22_1$. The A/D conversion unit $23_1$ changes the input signal into the RAW-RGB data which has for example 12 bits.

The RAW-RGB data is taken into the CMOS I/F 31 of the signal processor 39, and is saved in the SDRAM 29 through the memory controller 30. The RAW-RGB data read from the SDRAM 29 is converted into the YUV data 27 (YUV signal) in the YUV conversion unit 32, and is saved in the SDRAM 29 through the memory controller 30.

The YUV data 27 read from the SDRAM 29 via the memory controller 30 is transmitted to the LCD 9 via a display output control unit 45. The display output control unit 45 converts the YUV data 27 into a video signal. The video signal is supplied to the LCD 9 and an image is displayed in a live view (for real time monitoring). At the time of displaying the live view which displays an object image on the LCD 9, one frame is read in 1/30 seconds. Any changing of a frame rate is carried out by changing the cycle which reads the image data displayed on the LCD 9.

At the time of the live view operation, the object image is only displayed on the LCD 9 which functions as an electronic finder. The operation of release switch 2 has not been carried out yet at this time.

The CMOS I/F 31 computes an AF (automatic focus) evaluation value indicating the degree of focus of the object image, an AE (automatic exposure) evaluation value indicating the exposure state, and an AWB (automatic white balance) evaluation value from the RAW-RGB data.

The AF evaluation value is calculated by the integrated value of the brightness difference between neighboring pixels or the output integration value of a high frequency extraction filter. When the integrated value indicates that an AF area is in focus, the edge of the image in the AF area is clear and a high-frequency component is the largest. Therefore, during the AF operation, the AF evaluation value at each position of the focus lens 5 is acquired while the focus lens 5 is moved in the optical axis direction and a peak point position where the AF evaluation value is the maximum is detected.

The AE evaluation value and the AWB evaluation value are computed from each integration value of the RGB value in the RAW-RGB data. For example, the screen corresponding to the acceptance surface of all the pixels of the CMOS $19_1$, $19_2$ is divided into 256 areas (horizontally 16 divisions, perpendicularly 16 divisions), and the RGB value of each divided area is integrated.

The CPU block 40 reads the RGB integrated value, computes the luminosity of each area, and performs AE processing, which determines a proper light exposure from a luminance distribution. Based on the amount of light exposure determined by the AE processing, a setup of exposure conditions (the number of times of an electronic shutter of the CMOS $19_1$, the diaphragm value of the diaphragm unit $18_1$, etc.) is performed.

In AWB processing, the control value of AWB is determined from distribution of the RGB values corresponding to the color temperature of a light source. This AWB processing adjusts a white balance when carrying out a conversion process to the YUV data 27 in the YUV conversion unit 32. The above-mentioned AE processing and the AWB processing are continuously performed at the time of the live view operation.

Thus, by displaying the image to be photographed on the LCD 9 in real time, the photographer can sight the image to be photographed. Moreover, it is possible to also make an external display through a video cable such as a TV video signal from the display output control unit 45.

<Still Image Capture Operation in the Digital Still Camera>

When the release switch 2 is pushed from a $1^{st}$ release position (pushed halfway in) to a $2^{nd}$ release position (pushed all the way in) during the live view operation, a still image capture operation starts. The focal lens of the main optical system 5 moves to a focusing position by drive instructions to the motor driver 20$_1$ from the CPU 40.

For example, when auto focus ranges are all the areas from infinity (TELE) to closest (WIDE), the focal lens of the main optical system 5 moves to each position from infinity to closest or from closest to infinity. The CPU block 40 reads the AF evaluation value in each position. In the AF operation, the focal lens moves to the position that AF evaluation value becomes the maximum as the focus position.

The AE processing is performed after the AF operation. When the light exposure operation finishes, the CPU block 40 outputs a signal to the motor driver 20$_1$. The mechanical shutter unit 18$_1$ is closed by the signal. The CMOS 19$_1$ outputs the analog RGB image data for the still image, which is then changed into the RAW-RGB data by the A/D conversion unit 23$_1$ same as in the live view operation.

The RAW-RGB data is taken into the CMOS I/F 31 of the signal processor 39 and is converted into the YUV data 27 in the YUV conversion unit 32. Then the YUV data 27 is saved in the SDRAM 29 through the memory controller 30. The YUV data 27 is read from the SDRAM 29 and is converted into a size corresponding to the number of recording pixels in the resizing processing unit 33. The YUV data 27 is compressed in the data compression unit 34 to image data such as in JPEG form. After the compressed JPEG image data 28 is returned to the SDRAM 29, it is read from the SDRAM 29 through the memory controller 30, and is saved through a media I/F 46 at memory card 37.

The still image capture operation is performed with the digital camera 1 by the above operation.

<The Live View Display at the Time of Manual Focus>

Figure 3:
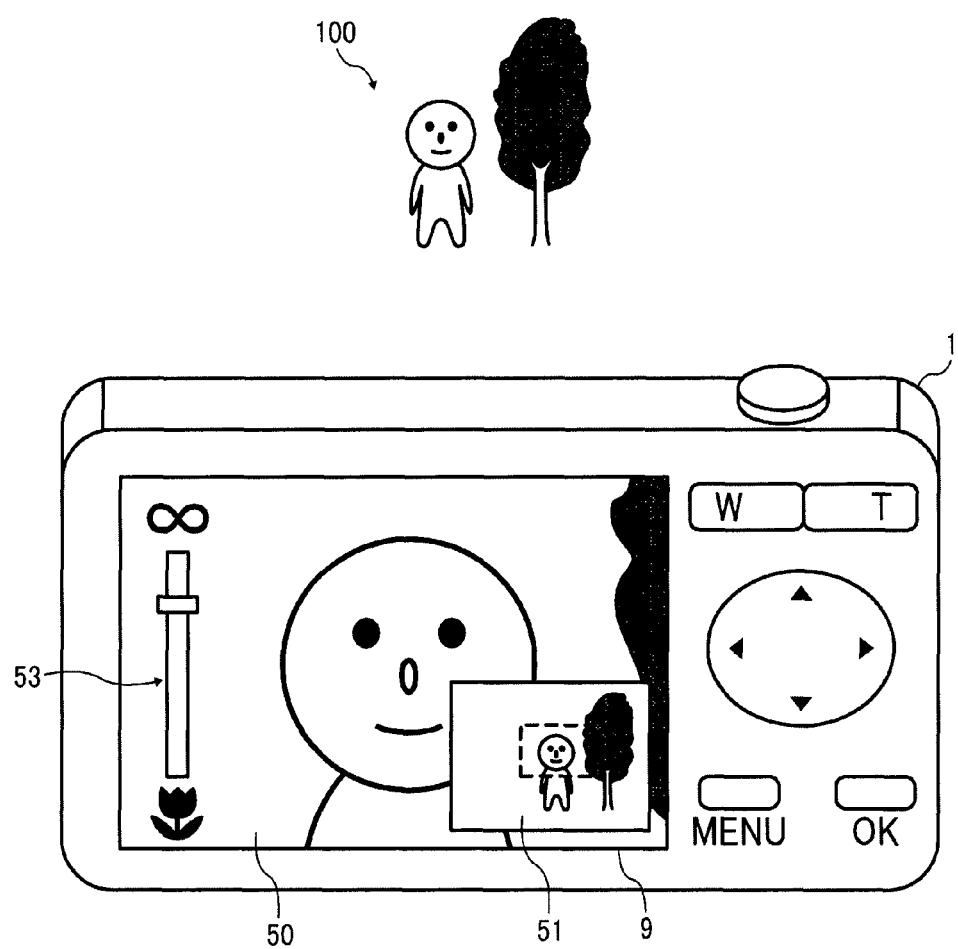
FIG. 3 is a diagram illustrating a live view image on the display device in a case of executing a manual focus operation corresponding to the first embodiment of the present invention.

An example of a live view display at the time of the manual focus in the digital camera 1 is shown in FIG. 3.

When performing the manual focus, the screen of LCD 9 in live view displays the image of the object 100 captured by the main optical system 5 and the image of the object 100 captured by the sub optical system 16 simultaneously.

The LCD 9 displays the partial enlarged image 50 in which the part of the object 100 is enlarged on the whole screen to evaluate the degree of focus. The partial enlarged image 50 is a part of the image captured by the main optical system 5. The photographer cannot judge the whole composition by the partial enlarged image 50. The sub optical system 16 captures a whole composition image 51 corresponding to the image captured by the main optical system 5. The LCD 9 displays the whole composition image 51 on its screen in a smaller size.

A bar 53 on the LCD 9 shows the present focal position. The lower end of the bar 53 means the present focal position is the nearest. The upper end of the bar 53 means the present focal position is the farthest. By operating the bar 53, the operator can set up the magnification ratio of the partial enlarged image 50 by the main optical system 5.

When the main optical system 5 is carrying out a zoom operation, the whole composition image 51 is also displayed in zoom according to the zoom magnification.

The whole composition image 51 includes the frame border (dashed line) therein which shows the partial enlarged image 50. The size of the frame border changes along with the magnification ratio of the partial enlarged image 50. The operator can set up the position of the area to be enlarged.

With the above described embodiment, the area of the partial enlarged image 50 is shown with the frame border. However, other methods are applicable, for example changing the color.

In a case of operating in the manual focus mode, the operator can evaluate the degree of focus of the main optical system 5 by the partial enlarged image 50 and confirm the whole composition image 51 captured by the sub optical system 16 on the screen of the LCD 9.

Therefore, the operator can take a picture of the object 100 with a proper focus state and a preferable composition by the above described digital camera.

Figure 4:
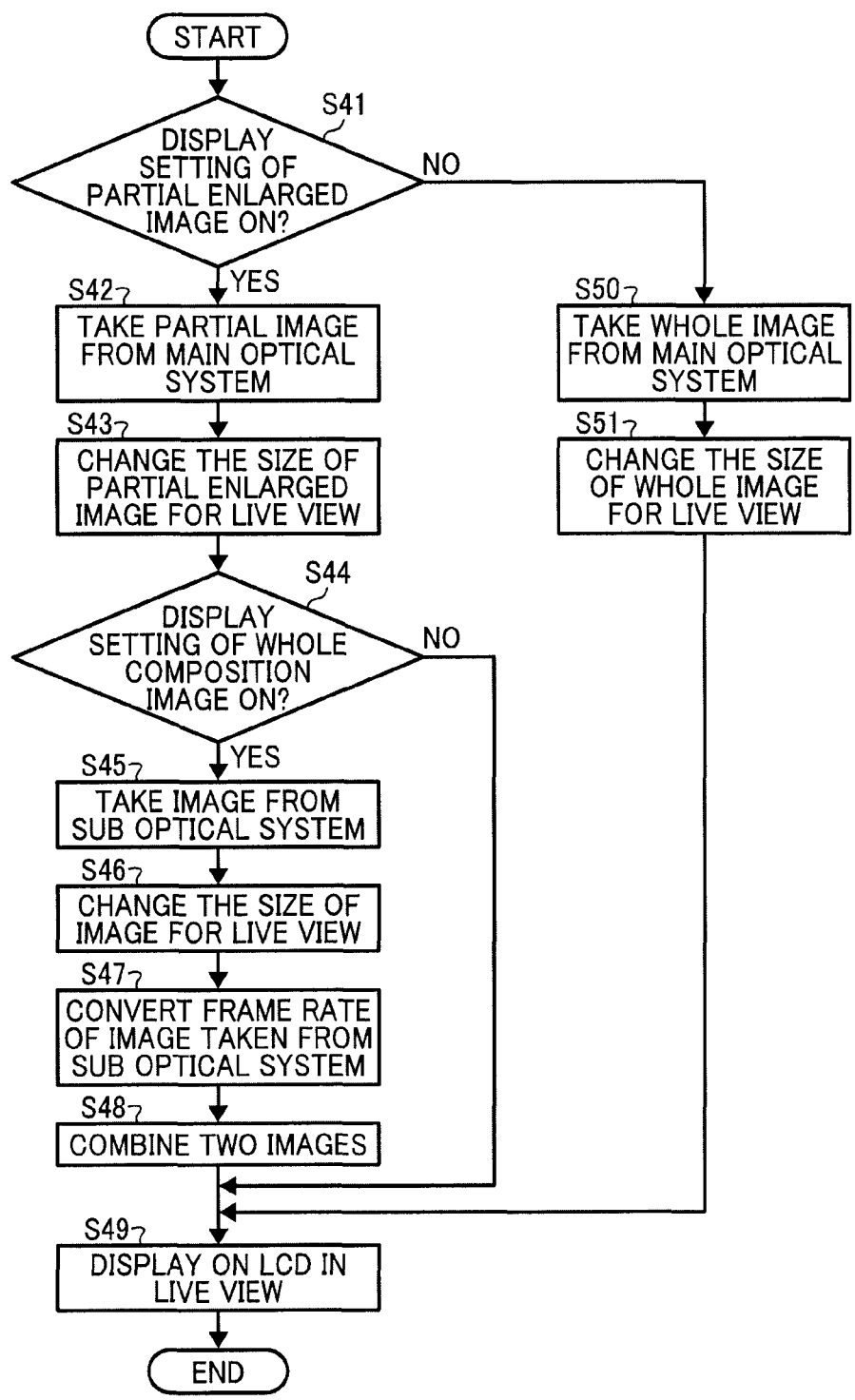
FIG. 4 is a flowchart illustrating a partial enlarged image and a whole composition image displayed in a display corresponding to the first embodiment of the present invention.

FIG. 4 is a flowchart illustrating processing of the live view image of the partial enlarged image 50 and the whole composition image 51.

When the manual focus mode starts, the CPU 40 checks a display setting of the partial enlarged image 50 captured by the main optical system 5 (Step S41).

When the display setting of the partial enlarged image 50 is ON (Yes in Step S41), a partial image is taken from an image of the main optical system 5 (Step S42). The size of the partial image is changed by the resizing processing unit 33 for the live view (Step S43).

Next, the CPU 40 checks a display setting of the whole composition image 51 captured by the sub optical system 16 (Step S44). When the display setting of the whole composition image is ON (Yes in Step S44), an image is captured by the sub optical system 16 (Step S45). The size of the image captured by the sub optical system 16 is changed by the resizing processing unit 33 for the live view (Step S46).

Next, the frame rate of the image captured by the sub optical system 16 is converted to the same frame rate of the image captured by the main optical system 5 (Step S47). The image 50 captured by the main optical system 5 and the image 51 captured by the sub optical system 16 are then combined (Step S48). Both combined images are displayed on the LCD 9 in live view (Step S49).

If the frame rate of the image captured by the sub optical system 16 is not converted, the partial enlarged image 50 and the whole composition image 51 would be displayed at different display timings on the LCD screen. Therefore, even if the operator evaluates the degree of focus and takes a picture, the whole composition image taken might actually be different from what the operator thinks is the composition.

According to the present embodiment, the partial enlarged image 50 and the whole composition image 51 are displayed at a same display timing on the screen because the frame rate of the image of the main optical system 5 is the same as the frame rate of the image of the sub optical system 16. The operator recognizes both images are displayed at substantially the same display timing (simultaneously), or with only a small difference in display timing, which is a difference in display timing small enough to not be perceptible to the human eye, and can take a picture without any feeling of unease or strangeness.

When the display setting of the partial enlarged image 50 is OFF at step S41 (No at Step S41), the whole image 51 by the main optical system is taken (Step S50). The size of the whole image 51 is changed by the resizing processing unit 33 for the live view (Step S51). The whole image is displayed on the LCD 9 in live view (Step S49).

The digital camera 1 of the present embodiment performs the live view display based on the display setting of the partial enlarged image 50 and the display setting of the whole composition image 51.

The first embodiment discloses the frame rate of the image captured by the sub optical system 16 is converted. The frame rate of the image captured by the main optical system 5, however, can also be converted. Further both the frame rates can be converted.

Figure 5:
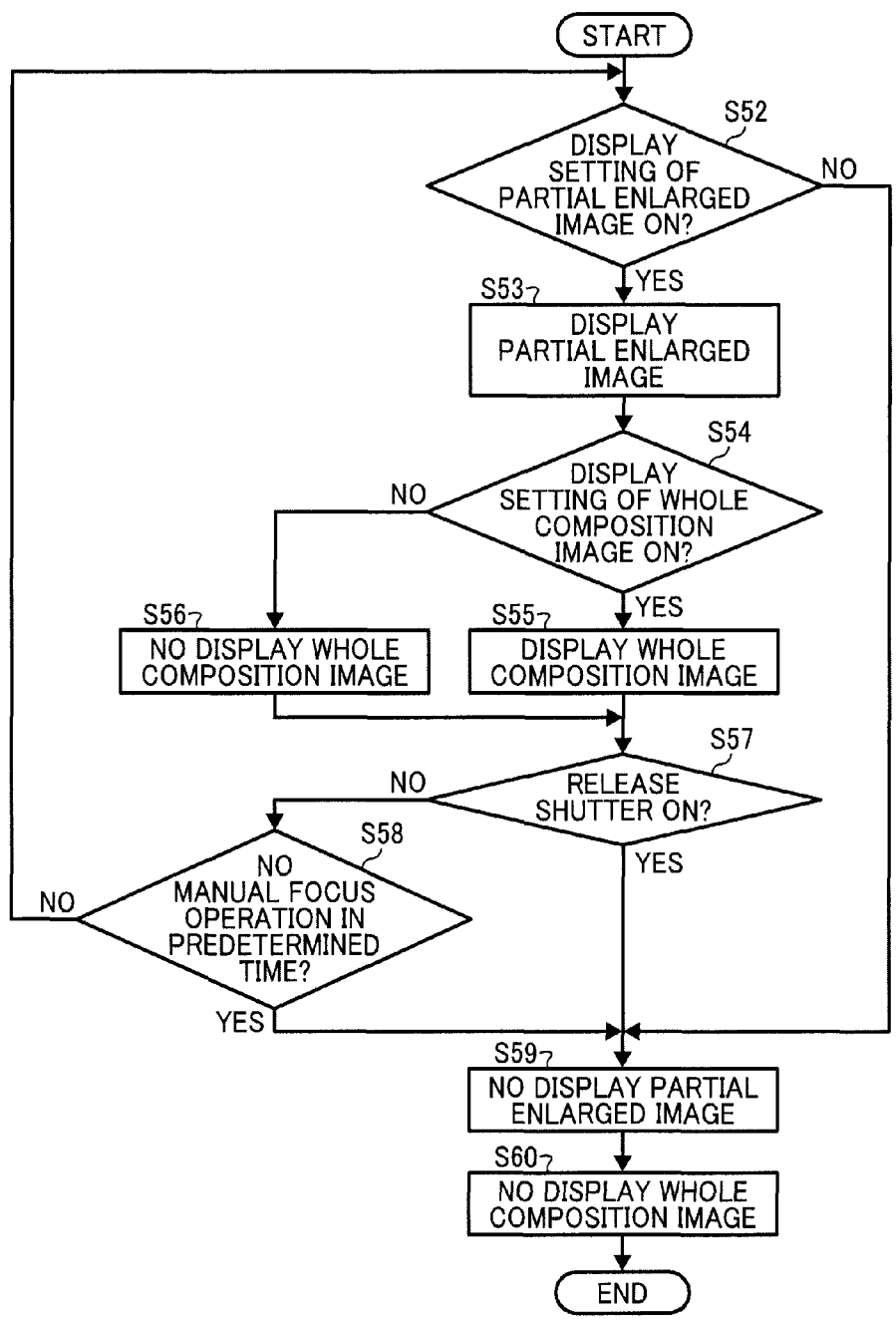
FIG. 5 is a flowchart illustrating a switching operation in a case of executing the manual focus operation corresponding to the first embodiment of the present invention.

FIG. 5 is a flowchart illustrating an example of switching the live view image in a case of operating in the manual focus mode of the digital camera 1.

When the manual focus operation is performed, the display setting of the partial enlarged image is checked (Step S52). When the display setting of the partial enlarged image is ON (Yes in Step S52), the partial enlarged image 50 captured by the main optical system 5 is displayed on the LCD 9 (Step S53).

Next, the display setting of the whole composition image 51 captured by the sub optical system 16 is checked (Step S54). When the display setting of the whole composition image is ON (Yes in Step S54), the whole composition image 51 is displayed on the LCD 9 (Step S55). When the display setting of the whole composition image is OFF (No in Step S54), the whole composition image 51 is not displayed on the LCD 9 (Step S56).

Pushing the release shutter 2 is checked (Step S57). When the release shutter 2 is pushed (Yes in Step S57), the partial enlarged image 50 and the whole composition image 51 are no longer displayed on the LCD 9 (Steps S59, S60).

When the release shutter 2 is not pushed (No in Step S57) and there is no manual focus operation in the predetermined time (No in Step S58), the partial enlarged image 50 and the whole composition image 51 are no longer displayed on the LCD 9 (Steps S59, S60).

By the above processing, the digital camera 1 performs switching behavior of the partial enlarged image 50 and the whole composition image 51 based on the settings.

In the case of operating in the manual focus operation, the above processing is performed automatically in the digital camera 1 by the CPU 40 and the LCD 9 displays a live view image which is proper for the operator to take a picture comfortably.

Figure 6A:
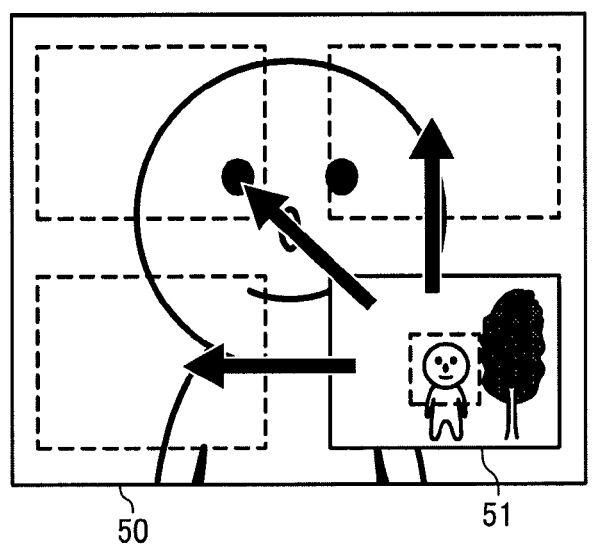
FIGS. 6A, 6B are diagrams illustrating a partial enlarged image and a whole composition image displayed in a display in a case of executing the manual focus operation corresponding to the first embodiment of the present invention.
Figure 6B:
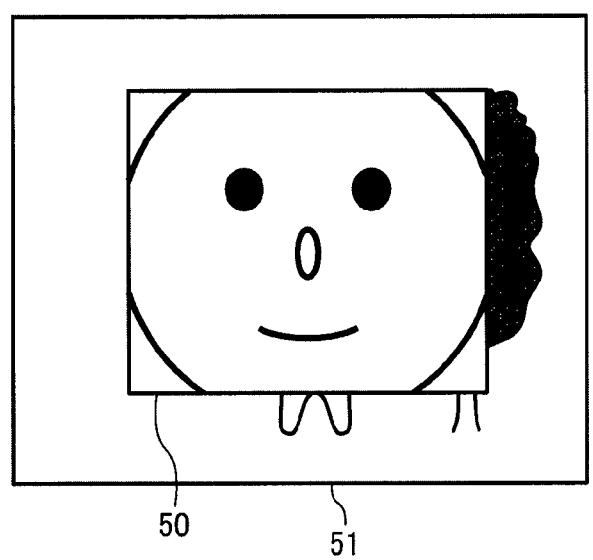

FIGS. 6A, 6B are examples to display the partial enlarged image 50 and the entire compose image 51 on the LCD 9 in a case of executing the manual focus operation.

FIG. 6A is a diagram illustrating the partial enlarged image 50 captured by the main optical system 5 is displayed on the LCD 9 in a case of operating in the manual focus mode of the digital camera 1. As shown in FIG. 6A with the frame borders (dashed lines), the whole composition image 51 is displayed at not only the right lower corner of the screen but also other corners alternatively.

FIG. 6B is a different example. FIG. 6B is a diagram illustrating the whole composition image 51 is displayed on the whole screen of the LCD 9 and the partial enlarged image 50 is displayed over the whole composition image 51.

Further, these two images can be displayed side by side alternatively.

<Decide the Display Position of the Live View Image Automatically>

When displaying the other image stacked on one image, an automatic methodology to decide the optimal area for displaying the stacked image can be executed.

Figure 7A:
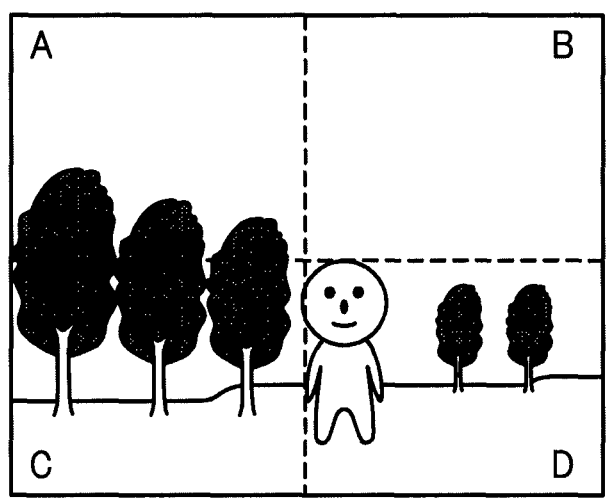
FIGS. 7A, 7B are diagrams illustrating a methodology to decide a display position when the partial enlarged image and the whole composition image are stacked on each other corresponding to the first embodiment of the present invention.
Figure 7B:
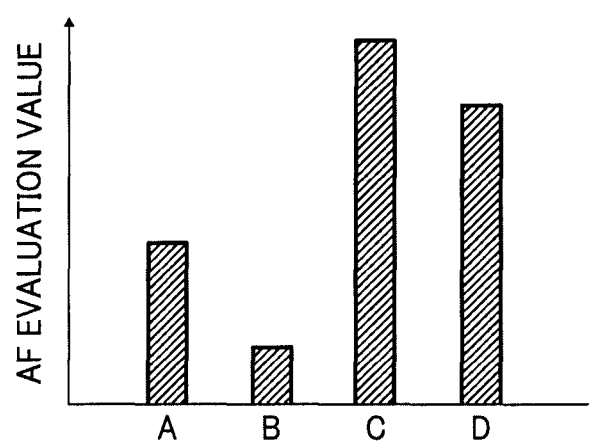

FIGS. 7A, 7B are diagrams illustrating an automatic methodology to decide a display position when the partial enlarged image 50 and the entire composition image 51 are stacked on each other FIG. 7A shows the live view image of the LCD 9 at the time of photography by the digital camera 1. The LCD 9 is divided into four areas and an indicator A-D is given to each area.

FIG. 7A shows the whole composition image 51 captured by the sub optical system 16 on the LCD 9. The display position determination method is shown in a case of displaying the partial enlarged image 50 by the main optical system 5 stacked on the whole composition image 51 in order to evaluate the degree of focus.

FIG. 7B shows the result of computing an AF evaluation value of divided areas A to D, respectively. As mentioned above, the AF evaluation value is calculated by the integrated value of the brightness difference between neighboring pixels or the output integration value of a high frequency extraction filter. The AF evaluation value expresses an amount of the contrast. In an upper right area, there is little difference of contrast between the neighboring pixels and thereby its AF evaluation value becomes the lowest. Since the area where the AF evaluation value is the lowest has the smallest amount of contrast as compared with other areas, it is considered that subjects therein that should be focused on are fewest. Therefore, it is desirable to display the images stacked on each other on that area.

In other words, the embodiment includes computing an AF evaluation value for every divided area A-D and specifying the area where the AF evaluation value is the lowest (B in this example). The images are displayed on that lowest value area stacked on each other. The operator can thereby take a picture without feeling stress that the main objects of a photograph are hidden.

Although this embodiment shows the image on the display is divided into four areas, the number of the areas of division is not restricted to four. For example, the number of areas of division can be changed according to the size of the image displayed.

FIG. 8 is a flowchart illustrating an example to decide a display position by an AF evaluation per the divided areas in a case of operating in the manual focus mode of the digital camera 1.

When the manual focus mode starts, the CPU 40 checks a display setting of the partial enlarged image (Step S81). When the display setting of the partial enlarged image is not ON at step S81 (No at step S81), the whole image by the main optical system 5 is taken (Step S92). The size of the whole image is changed by the resizing processing unit 33 for the live view (Step S93). The whole image is displayed on the LCD 9 in live view (Step S91).

When the display setting of the partial enlarged image is ON (Yes at step S81), a partial enlarged image is taken from an image of the main optical system 5 (Step S82). The size of the partial enlarged image is changed by the resizing processing unit 33 for the live view (Step S83).

Next, the CPU 40 checks a display setting of the whole composition image captured (Step S84). When the display setting of the partial enlarged image is not ON at step S84 (No at step S84), the partial enlarged image is displayed on the LCD 9 in live view in order to evaluate the degree of focus (Step S91).

When the display setting of the whole composition image is ON (Yes at step S84), the whole composition image is captured by the sub optical system 16 (Step S85). The size of the image captured by the sub optical system 16 is changed by the resizing processing unit 33 for the live view (Step S86).

Computing AF evaluation value per the divided area is then performed (Step S87). The area where the AF evaluation value is the lowest is selected as an area to display the whole composition image (Step S88).

The frame rate of the image captured by the sub optical system 16 is converted to the same as the frame rate of the image captured by the main optical system 5 (Step S89). The image captured by the main optical system 5 and the image captured by the sub optical system 16 are then combined (Step S90). Both combined images are displayed on the LCD 9 in live view (Step S91).

By performing the above processing, based on the AF evaluation value, the optimal area that displays the whole composition image is determined automatically, and therefore the two images are displayed as stacked on each other. The operator can thereby confirm images on the display device without feeling any stress or unease.

A second embodiment discloses a live view image on the LCD 9 in a case of executing the zoom operation of the digital camera 1.

Figure 9:
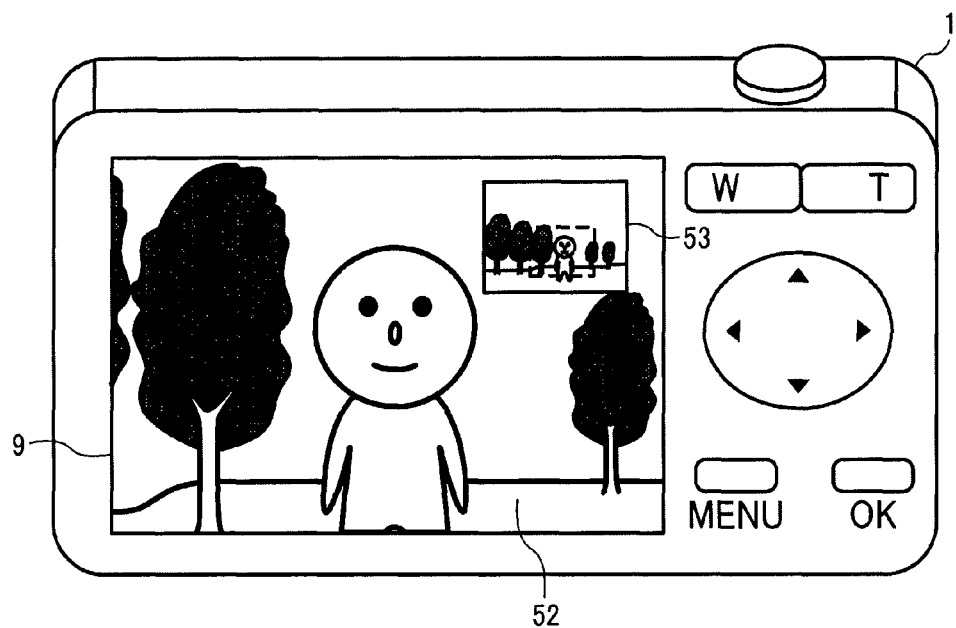
FIG. 9 is a diagram illustrating a live view image on the display device in a case of executing a zoom operation corresponding to a second embodiment of the present invention.

FIG. 9 is a diagram illustrating the live view image on the LCD 9 in a case of executing the zoom operation.

The LCD 9 of the digital camera 1 displays the zoomed image 52 on the entire screen, and it displays the surrounding image 53 with the zoomed image 52. The zoomed image 52 is an image of the object 100 which is zoomed on by the main optical system 5. The surrounding image 53 is an image surrounding the zoomed image 52 by the sub optical system 16.

In the surrounding image 53, the frame border (dashed line) shows the portion corresponding to the displayed zoomed image 52. The setting of the display as described is referred to as a zoom assistance setting. The display based on the zoom assistance setting is referred to as a zoom assistance view.

The zoomed image 52 might be displayed over the surrounding image 53 alternatively. These two images could also be displayed side by side alternatively. As the method to display the portion corresponding to the zoomed image 52 on the surrounding image 53, alternatively a color can be changed. With that method the operator can recognize the position of the zoomed image 52 in the surrounding image 53.

Figure 10:
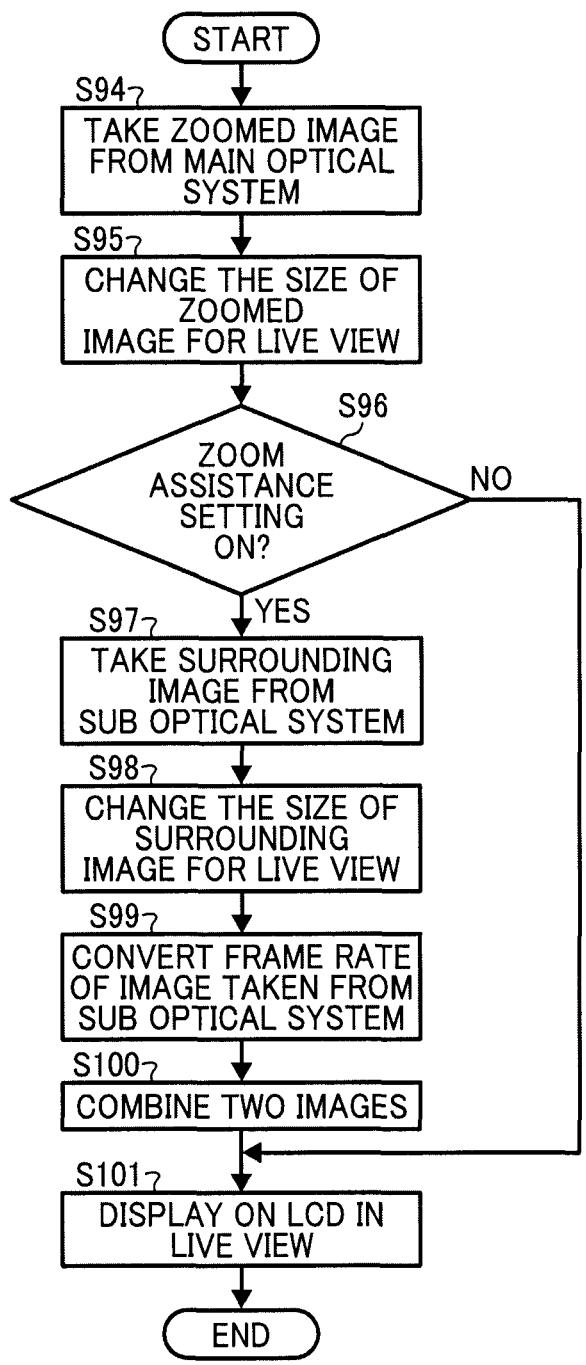
FIG. 10 is a flowchart illustrating an example to process the live view image in a case of executing the zoom operation corresponding to the second embodiment of the present invention.

FIG. 10 is a flowchart illustrating an example to process the live view image in a case of executing the zoom operation of the digital camera 1.

When the zoom operation is executed, the zoomed image 52 is captured by the main optical system 5 (Step S94). The size of the zoomed image 52 is changed by the resizing processing unit 33 for the live view (Step S95).

Next, the CPU 40 checks the zoom assistance setting (Step S96). When the zoom assistance setting is not ON (No in Step S96), the zoomed image 52 is displayed on the LCD 9 in live view (Step S101).

When the zoom assistance setting is ON at S96 (Yes in Step S96), the surrounding image 53 is captured by the sub optical system 16 (Step S97). The surrounding image 53 includes the area of the zoomed image 52. The angle of view of the surrounding image 53 is larger than that of the zoomed image 52.

The size of the image is changed for the live view (Step S98). The frame rate of the surrounding image 53 is converted to the same as the frame rate of the zoomed image 52 (Step S99). The frame rate of the zoomed image 52 can be converted or the frame rate of the both images 52, 53 can be converted alternatively.

By displaying both the zoomed image 52 and the surrounding image 53 at substantially the same display timing on the LCD 9 when the zoom operation starts, or with only a small difference in display timing, which is a difference in display timing small enough to not be perceptible to the human eye, the operator can confirm the view around the object 100 and take a picture properly without missing moves or changes around the object 100 during the zoom operation.

Even if the zoom operation by the main optical system 5 is performed, there are some cases in which there is no need for a zoom assistance view. For example, when there is almost no difference in the conversion focal length between the main optical system 5 and the sub optical system 16, the zoom assistance view is not necessary. When the angle of view of the main optical system 5 in the zoom position is wider than that of the sub optical system 16, the zoom assistance view is not necessary. The zoom position indicates the focal length in the zoom operation.

Figure 11:
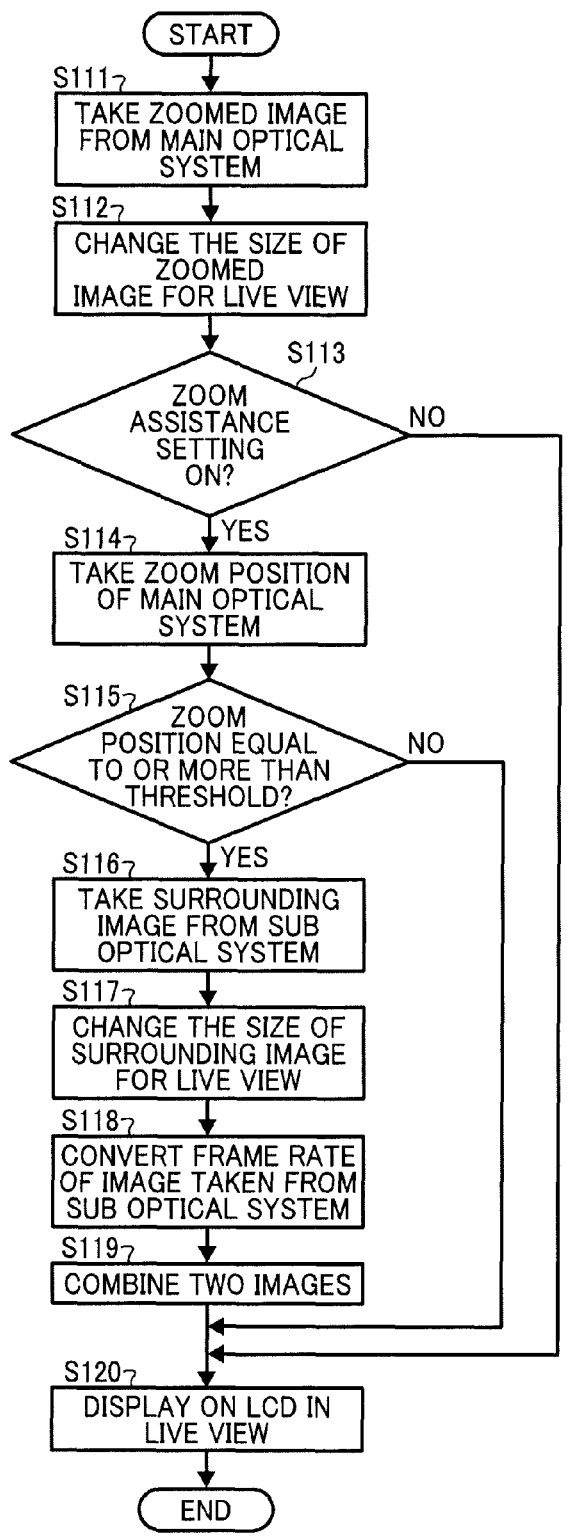
FIG. 11 is a flowchart illustrating an example to process the live view image based on a zoom position in a case of executing the zoom operation corresponding to the second embodiment of the present invention.

FIG. 11 shows an example of the flowchart to process the zoom assistance view based on the zoom position. A threshold is prepared in the zoom position of the main optical system 5. When the zoom position is less than the threshold in the zoom operation, the zoom assistance view is not performed.

When the zoom operation is started, the zoomed image 52 is taken from the main optical system 5 (Step S111). The size of the zoomed image 52 is changed by the resizing processing unit 33 for the live view (Step S112). Next, the CPU 40 checks the zoom assistance setting (Step S113). When the zoom assistance setting is not ON (No in Step S113), the zoomed image 52 is displayed on the LCD 9 in live view (Step S120).

When the zoom assistance setting is ON (Yes in Step S113), the zoom position of the main optical system 5 is taken (Step S114). The CPU block 40 checks whether the zoom position is greater than the threshold. When the zoom position is less than the threshold, the zoomed image 52 is displayed on the LCD 9 in live view (Step S120).

When the zoom position is equal to or greater than the threshold, the surrounding image 53 is captured by the sub optical system 16 (Step S116). The size of the surrounding image is changed by the resizing processing unit 33 for the live view (Step S117). The frame rate of the image captured by the sub optical system 16 is converted to the same as the frame rate of the image captured by the main optical system 5 (Step S118). The zoomed image 52 and the surrounding image 53 are then combined (Step S119). Both combined images are then displayed on the LCD 9 in live view (Step S120).

For example, the threshold can be set as 200 mm, when the focal length of the main optical system 5 is from 28 mm to 300 mm.

By performing the above processing, the surrounding image 53 is not displayed automatically when the zoom assistance view is not necessary, which is the case when the angle of view of the zoomed image 52 captured by the main optical system 5 is the same as the angle of view of the surrounding image 53 captured by the sub optical system 16, for example.

A third embodiment describes the live view image of the digital camera 1 when it includes plural sub optical systems that each have a different focal length.

<Live View Image of the Digital Camera when Including Plural Sub Optical Systems in a Case of Executing a Zoom Operation>

Figure 12:
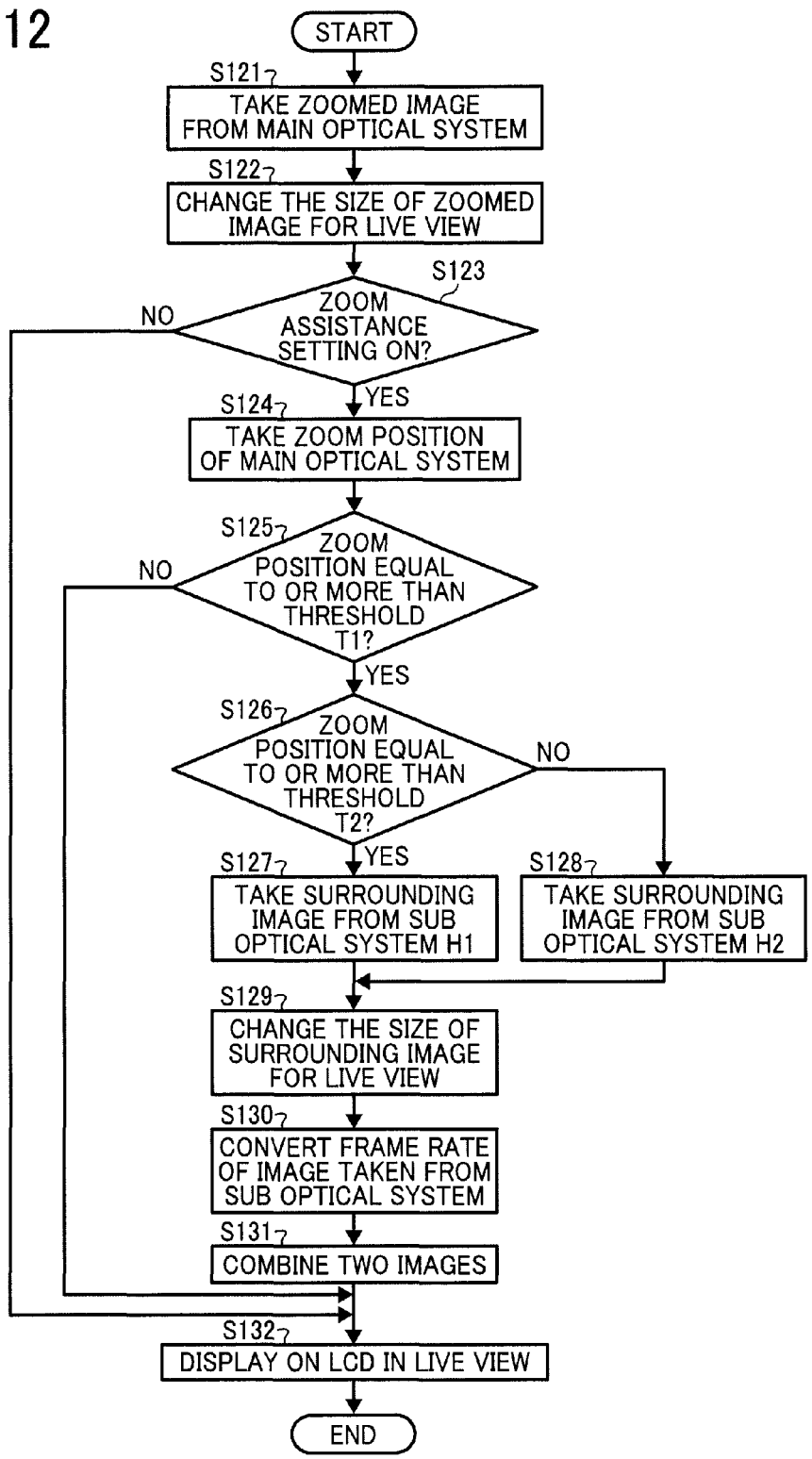
FIG. 12 is a flowchart illustrating an example to switch the live view image engaged in a zoom position of a sub optical image system in case of executing the zoom operation corresponding to a third embodiment of the present invention.

Hereinafter, the digital camera 1 includes two sub optical systems that have different focal length from each other. FIG. 12 is an example of the flowchart illustrating the process to select one of the live view images engaged in the zoom position of the main optical system 5.

The sub optical system having a longer focal length is referred to as H1 and the sub optical system having a shorter focal length is referred to as H2 in the two sub optical systems 16. The angle of view of H2 is wider than that of H1. Therefore, one of the images from the sub optical systems is selected for the zoom assistance view according to the angle of view of the zoomed image 52 captured by the main optical system 5. The angle of view of one of the images selected above is wider but not too much wider than that of the zoomed image 52.

When the zoom operation is started, the zoomed image 52 is taken from the main optical system 5 (Step S121). The size of the zoomed image 52 is changed by the resizing processing unit 33 for the live view (Step S122).

Next, the CPU 40 checks the zoom assistance setting (Step S123). When the zoom assistance setting is not ON (No in Step S123), the zoomed image 52 is displayed on the LCD 9 in live view (Step S132).

When the zoom assistance setting is ON (Yes in Step S123), the zoom position of the main optical system 5 is taken (Step S124). The CPU block 40 checks whether the zoom position is equal to or greater than the threshold T1 (Step S125). When the zoom position is less than the threshold T1 (No in Step S125), the zoomed image 52 is displayed on the LCD 9 in live view (Step S132). At step S132, since the angle of view of the zoomed image 52 captured by the main optical system 5 is substantially not different from that of the surrounding image 53 captured by the sub optical system 16, the surrounding image 53 is not displayed on the LCD 9.

When the zoom position is equal to or greater than the threshold T1 at step S125 (Yes at Step S125), the CPU block 40 checks whether the zoom position is equal to or greater than the threshold T2 (Step S126). Here, T2 is larger than T1.

When the zoom position is equal to or greater than the threshold T2 (Yes in Step S126), the surrounding image 53 is captured by the one of the sub optical system H1 which has a longer focal length (Step S127). When the zoom position is equal to or greater than the threshold T1 and less than the threshold T2 (No in step S126), the surrounding image 53 is captured by the one of the sub optical system H2 which has a shorter focal length (Step S128).

The size of the surrounding image is changed by the resizing processing unit 33 for the live view (Step S129). The frame rate of the surrounding image is converted to the same as the frame rate of the zoomed image 52 (Step S130). The zoomed image 52 and the surrounding image 53 are then combined (Step S131).

Both combined images are then displayed on the LCD 9 in live view (Step S132).

By performing the process described above, when the digital camera 1 has plural sub optical systems (H1 and H2) which have different focal lengths, the surrounding image 53 is displayed simultaneously corresponding to the angle of view of the zoomed image 52 captured by the main optical system 5. The operator can thereby confirm the live view image which is suitable for taking a picture.

Alternatively, the digital camera 1 of the present embodiment might have three or more sub optical systems. In this case, the number of the thresholds is three or more and one of the surrounding images which is most proper is selected and displayed. Further, the number of the surrounding images to be displayed can be equal to or more than 2, alternatively.

Figure 13:
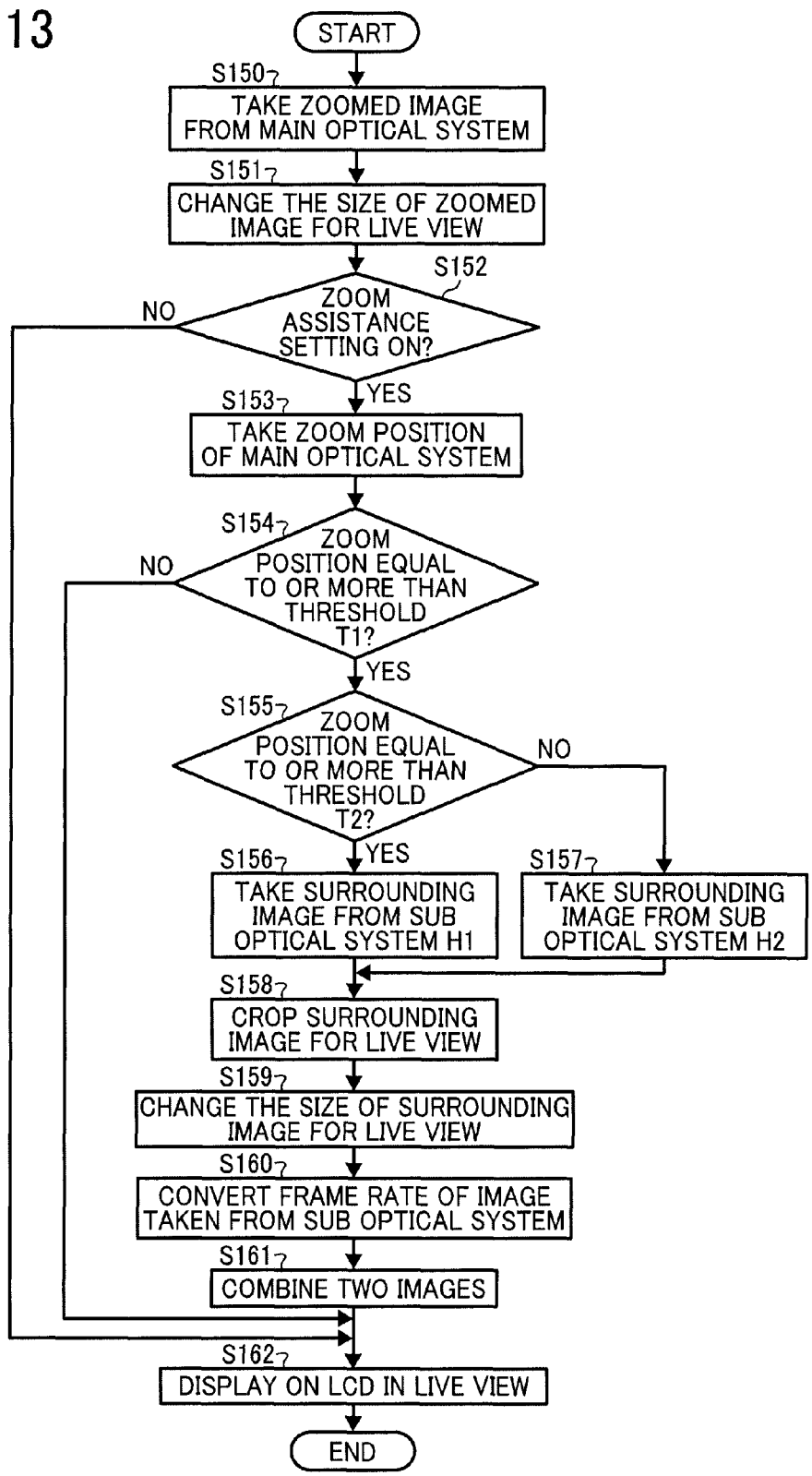
FIG. 13 is a flowchart illustrating examples to switch the live view image and to crop a part of an image engaged in a zoom position of a sub optical image system in a case of executing the zoom operation corresponding to the third embodiment of the present invention.

FIG. 13 is a flowchart illustrating the process to crop the image captured by the sub optical system 16 when the digital camera 1 includes two sub optical systems (H1 and H2), by which the operator can confirm the surrounding image 53 properly.

The focal length of the sub optical system H2 is shorter than that of the sub optical system H1. The angle of view of the sub optical system H2 is wider than that of the sub optical system H1.

When the zoom operation is started, the zoomed image 52 is taken from the main optical system 5 (Step S150). The size of the zoomed image 52 is changed by the resizing processing unit 33 for the live view (Step S151).

Next, the CPU 40 checks the zoom assistance setting (Step S152). When the zoom assistance setting is not ON (No in Step S152), the zoomed image 52 is displayed on the LCD 9 in live view (Step S162).

When the zoom assistance setting is ON (Yes in Step S152), the zoom position of the main optical system 5 is taken (Step S153). The CPU block 40 compares the zoom position to the thresholds T1 and T2 (Step S154 and S155).

When the zoom position is less than the threshold T1 (No in Step S154), the zoomed image 52 is displayed on the LCD 9 in live view (Step S162). At step S162, the surrounding image 53 is not displayed on the LCD 9.

When the zoom position is equal to or greater than the threshold T2 (Yes in Step S155), the surrounding image 53 is captured by the one of the sub optical system H1 which has a longer focal length (Step S156). When the zoom position is equal to or greater than the threshold T1 and less than the threshold T2 (No in step S155), the surrounding image 53 is captured by the one of the sub optical system H2 which has a shorter focal length (Step S157).

The surrounding image 53 is cropped according to the zoomed image 52 (Step S158). Specifically, it is desirable to crop the surrounding image 53 so that up-and-down width and right-and-left width become a size which is about 1.2 times larger than the size of the zoomed image 52 in a case of centering the zoomed image 52. The size for copping can be set as the operator likes, alternatively. Not only cropping but also enlarging can be set, alternatively.

The size of the surrounding image to be cropped is changed by the resizing processing unit 33 for the live view (Step S159). The frame rate of the surrounding image to be cropped is converted to the same as the frame rate of the zoomed image 52 (Step S160). The zoomed image 52 and the surrounding image 53 to be cropped are then combined (Step S161).

Both combined images are then displayed on the LCD 9 in live view (Step S162).

For example, the focal length of the main optical system 5 is from 28 mm to 300 mm. When the focal length of the sub optical system H1 and H2 are 80 mm and 28 mm respectively, the threshold T1 is set to 80 mm and the threshold T2 is set to 200 mm.

By performing the process described above, the surrounding image 53 is displayed simultaneously corresponding to the zoomed image 52. The operator can confirm the live view image which is suitable for taking a picture.

Alternatively, the digital camera 1 of the present embodiment might have three or more sub optical systems. Further, the number of the surrounding images to be displayed can equal to or more than 2, alternatively.

According to embodiments of the present invention, the digital camera displays a partial enlarged image 50 or the zoomed image 52 captured by the main optical system 5 and the whole composition image 51 or the surrounding image 53 captured by the sub optical system 16 with a same display timing (simultaneously) for the operator.

The operator can confirm the whole composition and the degree of focus in detail in a case of executing the manual focus operation. The operator can confirm the image surrounding the object in a case of executing the zoom operation. Therefore, the operator can take a picture with an easier operation.

Although the invention has been described with respect to specific embodiments, the claims are not to be limited but are to be construed as embodying all modifications and alternative constructions that may occur to one skilled in the art that fairly fall within the teachings herein set forth.

What is claimed is:

1. An image apparatus, comprising:
    a main optical system that captures a first image;
    a sub optical system that captures a second image to assist capturing the first image;
    a display device that displays the first image and the second image in a live view; and
    a signal processor that controls at least one of a frame rate of the first image from the main optical system or a frame rate of the second image from the sub optical system;
    wherein the signal processor controls the frame rate of the first image data or the second image data such that the first and second frame rates become the same, and the display device displays the first image and the second image on the display device.

2. The image apparatus as claimed in claim 1,
    wherein the first image which is displayed on the display device is a partial enlarged image of a whole image captured by the main optical system and the second image which is displayed on the display device is a whole composition image corresponding to the whole image captured by the sub optical system.

3. The image apparatus as claimed in claim 2,
    wherein the display device displays the first image and the second image on the display device in a manual focus operation.

4. The image apparatus as claimed in claim 2,
    wherein the second image which is displayed on the display device highlights an area corresponding to the first image which is displayed on the display device.

5. The image apparatus as claimed in claim 1,
    wherein the image apparatus executes a zoom operation, and the first image which is displayed on the display device is a zoomed image captured by the main optical system, and the second image which is displayed on the display device includes an area corresponding to the first image and has a wider angle of view than the first image.

6. The image apparatus as claimed in claim 5,
    wherein a focal length of the main optical system is equal to or greater than a threshold in the zoom operation.

7. The image apparatus as claimed in claim 5,
    wherein the second image which is displayed on the display device highlights an area corresponding to the first image which is displayed on the display device.

8. The image apparatus as claimed in claim 5, comprising plural sub optical systems,
    wherein the second image which is displayed on the display device is selected from one of the sub optical systems according to a focal length of the main optical system in the zoom operation.

9. The image apparatus as claimed in claim 5,
    wherein the second image which is displayed on the display device is enlarged or cropped according to a focal length of the main optical system in the zoom operation.

10. The image apparatus as claimed in claim 1,
    wherein one of the first image or the second image is displayed on the display device and the other of the first image or the second image is displayed over the one image such that the other image is displayed in an area that has a lowest AF evaluation value.

* * * * *